Figure 1:
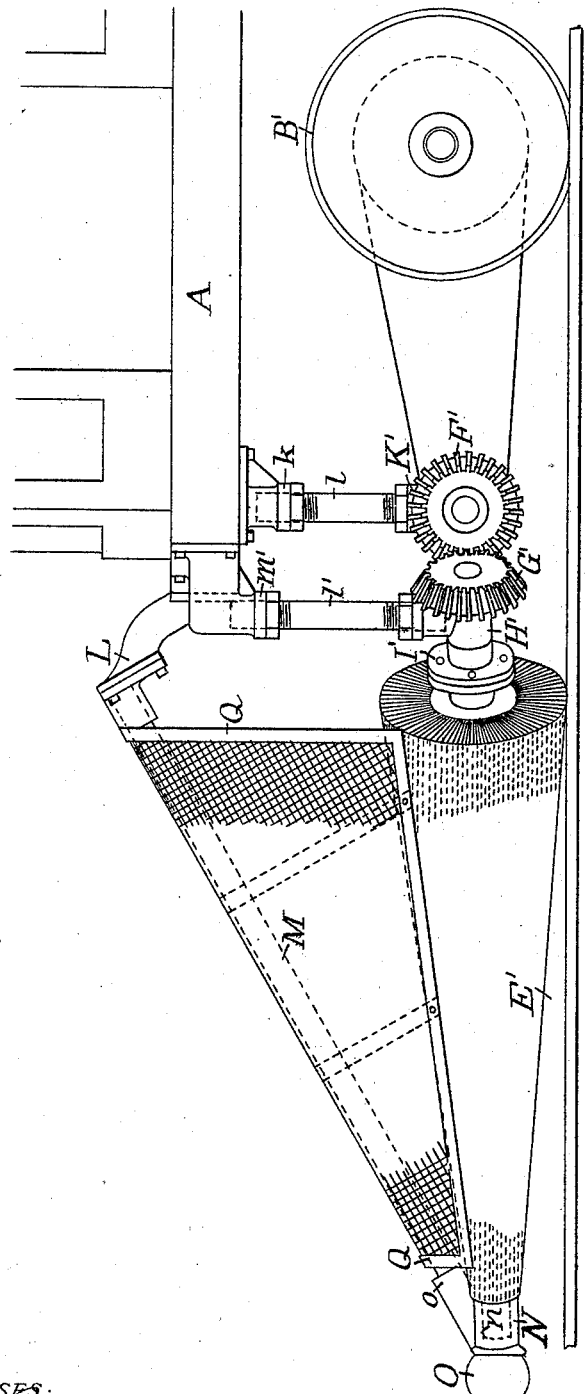

(No Model.)
2 Sheets—Sheet 1.

N. KOHLER.
CAR FENDER.

No. 585,871.

Patented July 6, 1897.

WITNESSES:
Wm J. Roberts
Wm McDrew

INVENTOR.
Nicholas Kohler
BY John F. Kerr
ATTORNEY.

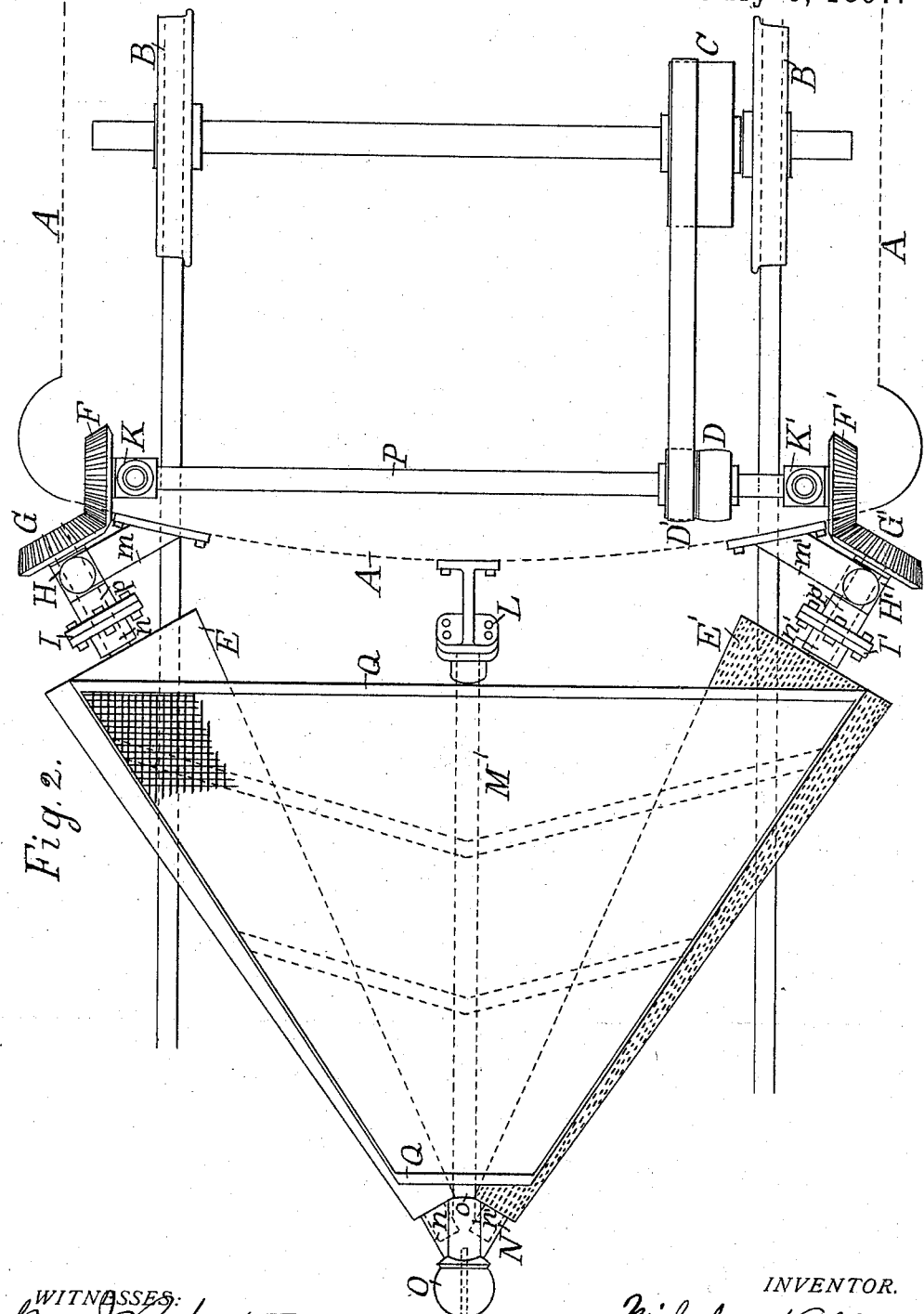

UNITED STATES PATENT OFFICE.

NICHOLAS KOHLER, OF PATERSON, NEW JERSEY, ASSIGNOR OF ONE-HALF TO MORTIMER INGLIS, OF SAME PLACE.

CAR-FENDER.

SPECIFICATION forming part of Letters Patent No. 585,871, dated July 6, 1897.

Application filed March 18, 1897. Serial No. 628,160. (No model.)

*To all whom it may concern:*

Be it known that I, NICHOLAS KOHLER, of the city of Paterson, in the county of Passaic and State of New Jersey, have invented certain new and useful Improvements in Car-Fenders, of which the following is a specification.

The invention relates to an improvement in car-fenders, and particularly to those used on trolley or cable cars.

The object of my invention is to provide a fender that will remove obstacles from the track in front of a car, a fender that will be easily operated, as well as durable, and that will also serve as a sweeper or track-cleaner, if desired.

The invention consists of a frame covered with network and conical brushes, all coming to a point in front, where the fender terminates in a ball of rubber, and the novel construction and arrangement of parts of the driving mechanism, as shown in the drawings and hereinafter described and claimed.

The conical brushes are mounted on shafts, which turn in bearings in brackets suspended from the car-body. To the inner ends of the brush-shafts are secured bevel-gears, which mesh with bevel-gears secured to an auxiliary shaft, which also turns in brackets suspended from the car-body and is provided with a fast and loose pulley. On the car-axle is also a pulley, and a band or belt passing around said pulleys (the fast one) cause the conical brushes to revolve when the car is in motion. The brackets in which the auxiliary shaft and brush-shafts are suspended may be shortened or lengthened to regulate the fender as to its distance above the rails.

In the accompanying drawings, in which similar letters of reference indicate like parts, Figure 1 is a side view of portion of car with my fender attached. Fig. 2 is a plan view of the same.

In the drawings, A is the car-body, and B B the front truck-wheels. A pulley C is secured to the car-axle. An auxiliary shaft P is suspended from the car-body in brackets and is provided with a fast and loose pulley D and D'. To the shaft P are secured the gears F and F'. The shaft has bearings at K and K', which are supported by the brackets $k$ $k'$ by means of the threaded pipes $l$. The conical brushes E and E' are mounted on shafts $n$ and $n'$, the inner ends of said shafts entering the short tubular shafts $p$ $p'$, to which are keyed the bevel-gears G G'. Bearings H H' for shafts $p$ $p'$ are supported by pipes $l'$, which are threaded at both ends and are secured to the brackets $m$ $m'$, which are in turn secured to the car-body A. The wheels G G' gear into the wheels F F', and the short tubular shafts $p$ $p'$ are secured to collars or couplings I I' to cause the shafts $n$ $n'$ and $p$ $p'$ to turn together. The bracket L supports the brace M of the fender-frame, the front end of fender-frame terminating in the casting N, which is provided with bearings for the front end of the shafts $n$ $n'$. To the casting N is secured a rubber ball O, and the fender-frame is covered with netting Q to a point a little below the top of the rotary brushes E E' in order to prevent anything from entering between the brushes and the netting on the fender-frame.

The fender slopes gently from the main brace M to the edges, where they cover the top of the brushes and from the rear portion to the rubber ball in front, so that my fender is not intended to pick up and carry obstacles or objects, but to throw them aside.

With this description of my invention, what I claim is—

In a car-fender, the car-truck axle having the pulley C secured thereto, and the auxiliary rotating shaft P, having the fast and loose pulleys D, D', the bearings K and K' for shaft P suspended from brackets $k$ and $k'$, by means of the threaded pipes $l$ $l'$, and the bevel-gears F and F' keyed to each end of the shaft P, in combination with the rotating conical-shaped brushes E and E', the short shafts $n$ and $n'$ and $p$ and $p'$ coupled together, the bevel-gears G and G' keyed to the shafts $p$ and $p'$ and meshing with the bevel-gears F and F' on the shaft P, the brackets $m$ and $m'$, threaded pipes $l$ and $l'$ and bearings H and H' for shafts $p$ and $p'$, the frame having the brace M and the casting N, a bracket L to which the brace M is secured, bearings in the casting N for outer ends of shafts $n$ and $n'$, a rubber cushion secured to casting N, the netting Q and means for communicating motion from the car-axle to the shaft P to rotate the conical brushes substantially as shown and described.

NICHOLAS KOHLER.

Witnesses:
J. F. KERR,
WM. M. DREW.